United States Patent
Mattes et al.

(10) Patent No.: US 6,621,301 B1
(45) Date of Patent: Sep. 16, 2003

(54) PASS-DRIVER CIRCUIT FOR TWO-CONDUCTOR BUS-SYSTEM

(75) Inventors: Bernhard Mattes, Sachsenheim (DE); Jochen Seibold, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,424

(22) PCT Filed: Jun. 7, 2000

(86) PCT No.: PCT/DE00/01851
§ 371 (c)(1),
(2), (4) Date: Mar. 27, 2002

(87) PCT Pub. No.: WO00/77977
PCT Pub. Date: Dec. 21, 2000

(30) Foreign Application Priority Data

Jun. 9, 1999 (DE) .......................... 199 26 173

(51) Int. Cl.$^7$ ............................................ H03K 19/094
(52) U.S. Cl. .......................................................... 326/86
(58) Field of Search ............................... 326/31–34, 82, 326/83, 86, 90, 59

(56) References Cited

U.S. PATENT DOCUMENTS 5,357,518 A   10/1994   Peter
6,028,467 A * 2/2000   Burrows et al. ............ 327/331
6,175,250 B1 * 1/2001  Hedberg ....................... 326/83

FOREIGN PATENT DOCUMENTS

| DE | 39 01 589   | 7/1990  |
|----|-------------|---------|
| DE | 195 09 133  | 10/1995 |
| DE | 196 11 944  | 10/1997 |
| DE | 198 13 952  | 11/1999 |

* cited by examiner

Primary Examiner—Anh Tran
(74) Attorney, Agent, or Firm—Kenyon & Kenyon

(57) ABSTRACT

A bus driver circuit which permits input of data, which can be identified reliably by modules on the bus line, onto the bus in the event of a short circuit on a conductor in a two-conductor bus system without requiring complicated circuitry is composed of several electrically controllable switches which form an H-bridge configuration, at least one switch being present in each of the five H-bridge branches. The two bus conductors are each connected to one end of the shunt arm of the H-bridge. The individual switches in the longitudinal branches of the H-bridge can be switched to at least two positions which are at different voltage levels.

6 Claims, 3 Drawing Sheets

PASS-DRIVER CIRCUIT FOR TWO-CONDUCTOR BUS-SYSTEM

FIELD OF THE INVENTION

The present invention relates to a bus driver circuit for a two-conductor bus system connected to a control unit containing the bus driver circuit and multiple actuator modules and/or sensor modules in a motor vehicle, with the bus driver circuit supplying signals in the form of a pulse train formed by different voltage levels into the healthy bus conductor in the event of a short circuit on one of the two bus conductors.

BACKGROUND INFORMATION

Actuators and sensors are being installed in increasing numbers in motor vehicles to regulate the power train, brake systems, driving performance and restraint systems for the protection of occupants of the vehicle. Heavy and bulky cable harnesses can be eliminated by introducing bus systems linking together the actuators, the sensors and the respective control units.

In the case of a bus for a safety-relevant system such as a restraint system in particular, measures must be taken so that a fault on the bus conductors will not result in a system failure resulting in the restraint systems not being deployed in the event of a crash situation. For such a bus, there is therefore the requirement that signal transmission must be possible between a central control unit and actuators and/or sensors connected to the bus even in the event of a short circuit to the battery voltage of the vehicle or to ground on one of the two bus conductors. For this reason, the German Published Patent Application No. 198 13 952 describes a bus driver circuit with which it is possible to transmit messages in the form of pulse trains formed by two different voltage levels over the intact bus conductor in the event of a short circuit on one of the two bus conductors. The bus driver circuit is a series connection of three switches at two different voltage potentials.

SUMMARY OF THE INVENTION

An object of the present invention is to provide a bus driver circuit which requires the least possible circuitry complexity and permits data to be injected into the bus in such a form that it can be identified reliably by the actuator modules and/or sensor modules connected to the bus.

This object is achieved through the fact that the bus driver circuit is composed of multiple electrically controllable switches forming an H-bridge configuration, at least one switch being present in each of the five H-bridge branches, the two bus conductors are each connected to one end of the shunt arm of the H-bridge, and the individual switches in the longitudinal branches of the H-bridge can be switched into at least two positions which are at different voltage levels.

Accordingly, it is expedient that the switches in two longitudinal branches of the H-bridge, starting from different ends of the shunt arm, can be switched to positions which are at different high voltage levels, and the switches in the two other longitudinal branches can be switched to positions which are at different low voltage levels. In the event of a short circuit on one of the two bus conductors, the switches in the longitudinal branches of the H-bridge that are connected to the healthy bus conductor are switched to switch positions so that a desired pulse train occurs on the healthy bus conductor. In the event of a short circuit in a bus conductor to ground, a switch connected to this bus conductor and having a switch position at ground potential is preferably switched to this position.

In the case of messages having a high transmission rate, the at least one switch in the shunt arm is expediently closed briefly between switching through different voltage levels over switches in the longitudinal branches of the H-bridge. This increases steepness of the edges of the pulses transmitted, thus permitting a high pulse transmission rate. Messages requiring a high transmission rate include, for example, deployment commands for restraint systems.

The pulse trains transmitted are preferably Manchester encoded, thus permitting easy synchronization of actuator modules and/or sensor modules.

DETAILED DESCRIPTION

Figure 1:
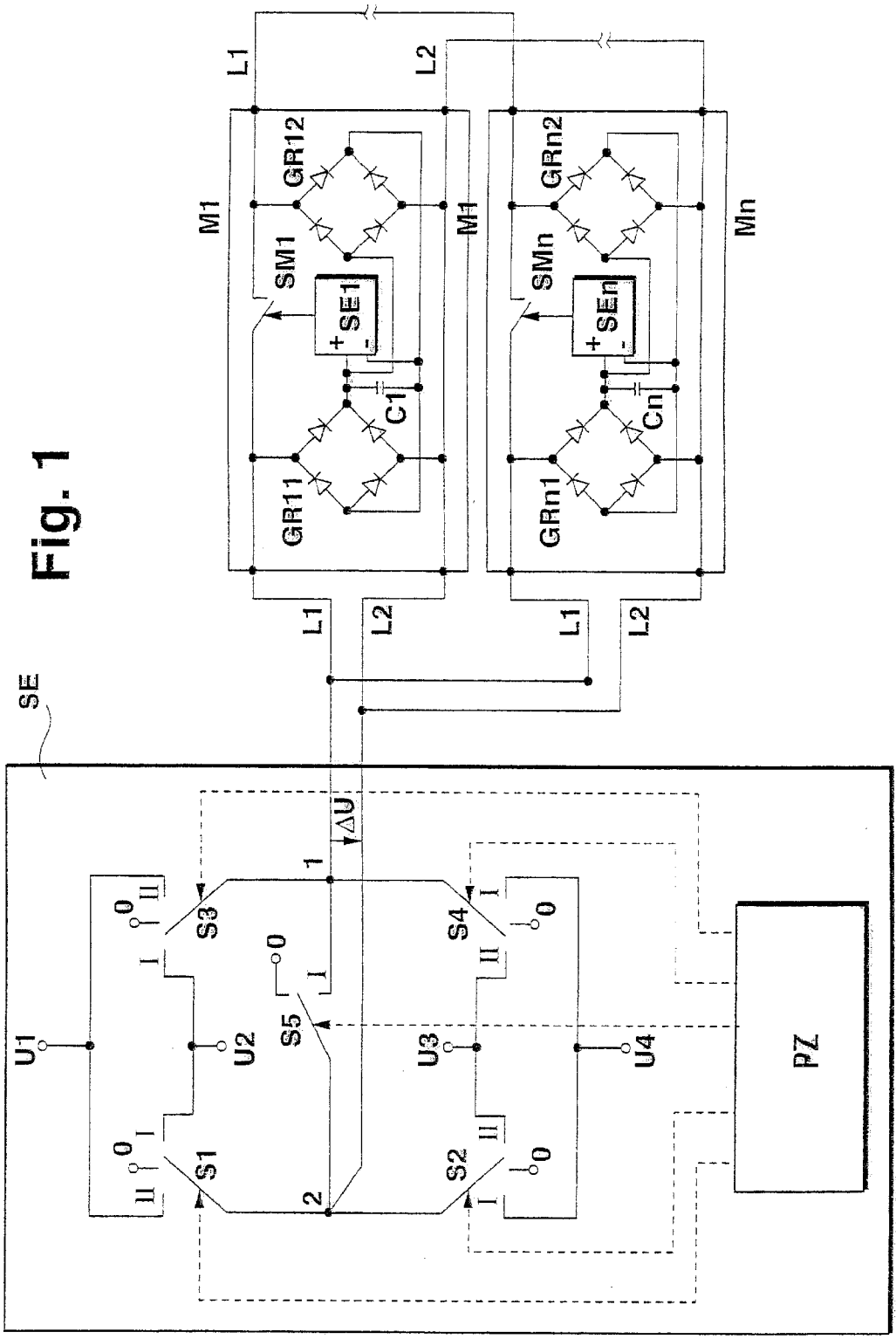
FIG. 1 shows a circuit diagram of a bus driver and multiple modules connected to the bus.

FIG. 1 shows a bus system composed of a two-conductor bus L1 and L2 connected to a control unit SE and n actuator modules and/or sensor modules, this figure showing modules M1 and Mn. The two-conductor bus system illustrated here has a ring structure, for example, i.e., both ends of bus conductors L1 and L2 are connected to control unit SE.

In control unit SE there is a bus driver circuit composed of multiple electrically controllable switches S1, S2, S3, S4 and S5 forming an H-bridge configuration. In practice, switches S1, . . . , S5, which are identified with a simple switch symbol, are preferably MOS field-effect transistors. Instead of switch S1, . . . , S5 shown here, multiple switches may also be provided in the individual branches of the H-bridge, their switching function optionally depending on the direction of the current flowing through the switch. As indicated by broken lines, individual switches S1, . . . , S5 are controlled by a processor PZ in control unit SE. Two bus conductors L1 and L2 are connected to the shunt arm of the H-bridge in which switch S5 is located. First bus conductor L1 is connected to a tie point between the shunt arm having switch S5 and the two longitudinal branches having switches S3 and S4 of the H-bridge. Second bus conductor L2 is connected to tie point 2 between the other end of the shunt arm having switch S5 and the two longitudinal branches having switches S1 and S2. Switches S1, S2, S3 and S4 in the longitudinal branches of the H-bridge have three different switch positions 0, I and II. Switch positions I of two switches S1 and S3 in the two upper parallel longitudinal branches of the H-bridge are at a voltage level U2, and switch positions II of two switches S1 and S3 are at a voltage level U1. Voltage level U1 is between approximately 20 and 30 V, for example, and voltage level U2 is a few volts (e.g., 2 V) lower than voltage level U1. In their switch positions I, two switches S2 and S4 in the two lower parallel longitudinal branches of the H-bridge establish for two bus conductors L1 and L2 a connection of connection points 1 and 2 for the two bus conductors L1 and L2 to a voltage level U4 having a much lower value than voltage level U1 and preferably being the ground potential of 0 V. In switch position II, switches S2 and S4 put connection points 1 and 2 of the two bus conductors L1 and L2 at a voltage level U3 a few volts (e.g., 2 V) above lowest voltage level U4.

Figure 2A:
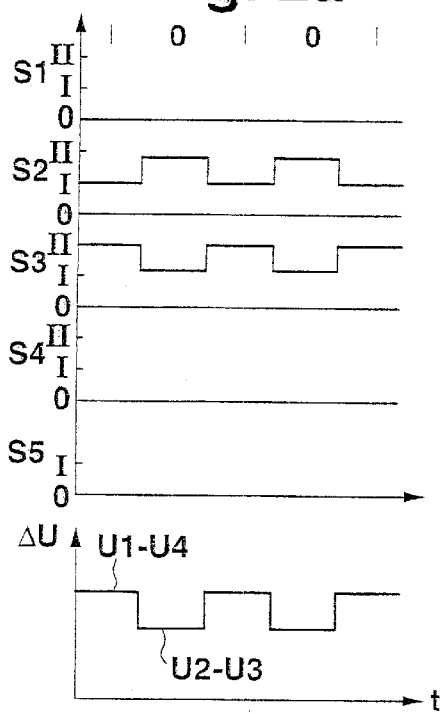
FIG. 2a shows a first possible switching operation of the bus driver circuit in the case of healthy bus conductors.
Figure 2B:
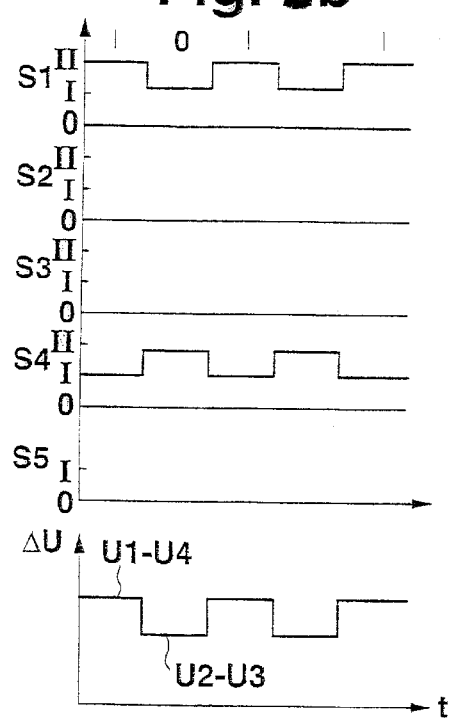
FIG. 2b shows a second possible switching operation of the bus driver circuit in the case of healthy bus conductors.

FIGS. 2a and 2b show how processor PZ controls individual switches S1, . . . , S5 of the H-bridge to transmit a message to modules M1, Mn when both bus conductors L1 and L2 are healthy, i.e., there is no short circuit. Messages sent out over the bus by control unit SE to modules M1 through Mn are in the form of a pulse train made up of two different voltage levels, a high differential voltage $\Delta U$ between two bus conductors L1 and L2 corresponding to a logical 1, and a low differential voltage $\Delta U$ corresponding to a logical 0. The bottom portion of each of FIGS. 2a and 2b shows a curve for differential voltage $\Delta U$ between two bus conductors L1 and L2 when a bit string 10101, for example, is to be transmitted. The high level of differential voltage $\Delta U$, which corresponds to a logical 1, arises from the difference between the two voltage levels U1 and U4, and low differential voltage level $\Delta U$ corresponds to the difference between the two voltage levels U2 and U3. The two differential voltage levels $\Delta U=U1-U4$ and $\Delta U=U2-U3$ thus occur either due to the fact that two switches S2 and S3, which are connected to bus conductors L1 and L2 as shown in FIG. 2a , or switches S1 and S4, which are also connected to the two bus conductors L1 and L2, are controlled in common mode. To form higher differential voltage levels $\Delta U=U1-U4$, either switch S2 is switched to position I and switch S3 is switched to position II (FIG. 2a ) or switch S1 is switched to switch position II and switch S4 is switched to switch position I (FIG. 2b ). The lower differential voltage level $\Delta U=U2-U3$ occurs due to the fact that either switch S2 is switched to switch position II and switch S3 is switched to switch position I (FIG. 2a ) or switch S1 is switched to switch position I and switch S4 is switched to switch position II (FIG. 2b ). FIGS. 2a and 2b illustrate how a symmetrical voltage modulation in phase opposition is produced on bus conductors L1 and L2, thus minimizing any possible emission of interference signals.

All the other switches except for switches S2 and S3 or S1 and S4 remain in their switch position 0, so that no voltage potential at all flows over them to bus conductors L1 and L2.

Because of severe mechanical loads, in particular in the course of an accident, one of two bus conductors L1 or L2 may become short circuited to ground or to battery voltage. It is very important for a safety-relevant device such as a restraint system to have communication between the control unit and the actuator modules and/or sensor modules M1, Mn even in the event of such a short circuit on one of the two bus conductors L1, L2. In the case of a restraint system, communication between control unit SE and modules M1, Mn connected to bus conductors L1, L2 is composed of a diagnostic inquiry directed by control unit SE to individual modules M1, Mn and—in the event of a crash—commands for deployment of the restraint systems (airbags, seat-belt tightening systems, etc.) controlled by modules M1, Mn.

If the bus driver circuit is to be controllable by processor PZ in a manner suitable for signal transmission over the bus in the event of a short circuit, it is to have an arrangement for detecting whether and on which of the two bus conductors L1, L2 there is a short circuit. Such short-circuit detection is known from German Published Patent Application No. 195 09 133, for example. Details of this short-circuit detection, which is essentially known per se, will not be presented here because they are not included in the object of the present invention.

Figure 3A:
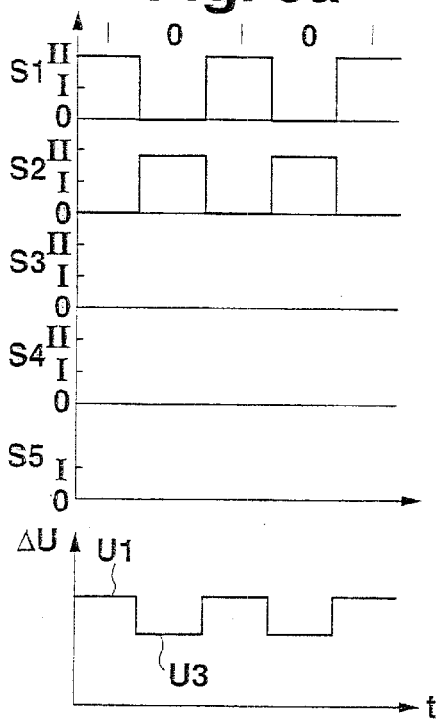
FIG. 3a shows switching operations of the bus driver circuit in the event of a short circuit to ground in the first bus conductor.

FIG. 3a shows how switches S1, . . . , S5 of the H-bridge are to be controlled in the event of a short circuit to ground in bus conductor L1 if a bit string 10101, for example, is to be transmitted to modules M1, Mn. A logical 1 appears due to the fact that switch S1, connected to bus conductor L2, which is not short-circuited, is switched to switch position II, and switch S2, which is also connected to bus conductor L2, is switched to switch position 0. Then bus conductor L2 is at voltage U1, and thus a voltage difference $\Delta U=U1$ exists between conductor L2 and conductor L1, which is short-circuited to ground. If a logical 0 is to be transmitted, switch S1 is switched into switch position 0 and switch S2 is switched into switch position II. Then conductor L2 is at voltage level U3, and there is a voltage difference $\Delta U=U3$ between conductor L2 and conductor L1 which is short-circuited to ground. It is expedient to keep switch S4 constantly in switch position I in order to thus keep short-circuited conductor L1 fixedly at potential U4=0 V corresponding to the ground potential. However, switch S4 may also be kept in switch position 0. Other switches S3 and S4 also assume switch position 0 permanently.

Figure 3B:
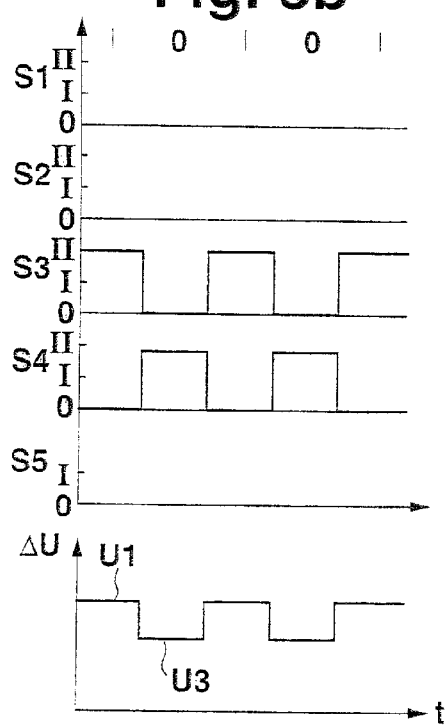
FIG. 3b shows switching operations of the bus driver circuit in the event of a short circuit to ground in the second bus conductor.
Figure 4A:
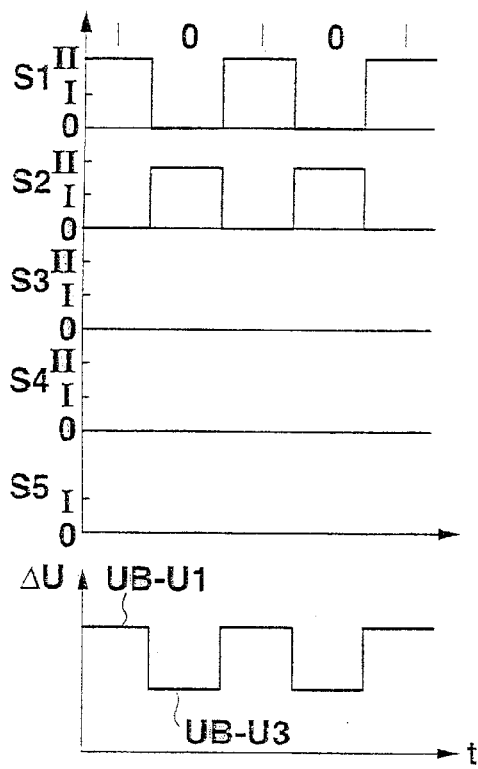
FIG. 4a shows switching operations of the bus driver circuit in the event of a short circuit to the battery voltage of the vehicle in the first bus conductor.

FIG. 3b shows the switch positions for the case when conductor L2 is short-circuited to ground. To transmit a logical 1 over the bus here, switch S3 is brought into switch position II, and switch S4 is brought into switch position 0. Then conductor L1 is at voltage level U1. A differential voltage $\Delta U=U1$ is now applied between conductor L1 and conductor L2, which is short-circuited to ground. A logical 0 occurs due to the fact that switch S3 is switched into switch position 0, and switch S4 is switched into switch position II. A voltage difference of $\Delta U=U3$ then exists between two conductors L2 and L1. Switch S2 can be switched permanently to switch position I, so that conductor L2 which is short-circuited to ground is kept at potential U4, which amounts to 0 V and therefore corresponds to the ground potential. Other switches S1 and S5 are kept permanently in switch position 0. FIG. 4a shows the switch positions of switches S1, . . . , S5 for the case when first bus conductor L1 is short-circuited to battery voltage UB of the vehicle. Switch S1 is switched to switch position II, and switch S2 is switched to switch position 0 for transmission of a logical 1. Then a differential voltage $\Delta U=UB-U1$ exists between conductor L2 and conductor L1, which is short-circuited to battery voltage UB. A logical 0 occurs because switch S1 is switched to switch position 0 and switch S2 is switched to switch position II. The differential voltage then existing between conductors L1 and L2 amounts to $\Delta U=UB-U3$. The other switches S3, S4 and S5 remain in switch position 0.

Figure 4B:
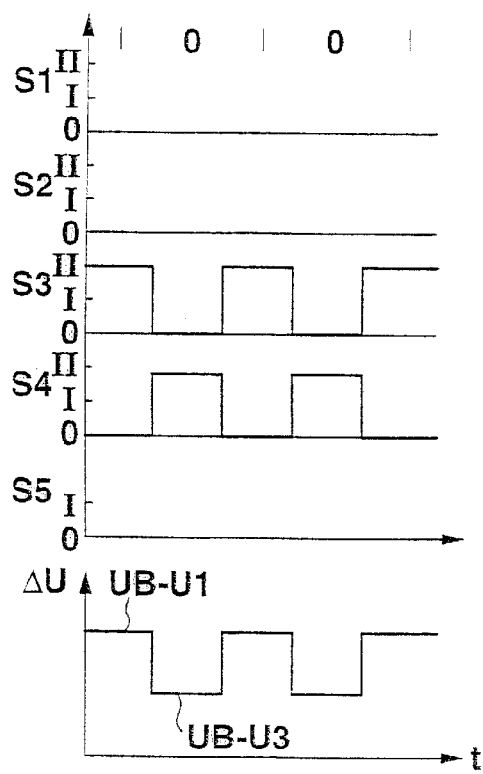
FIG. 4b shows switching operations of the bus driver circuit in the event of a short circuit to the battery voltage of the vehicle in the second bus conductor.

FIG. 4b shows the switch positions for the case when second bus conductor L2 is short-circuited to battery voltage UB. A logical 1 occurs here because switch S3 is switched to switch position II and switch S4 is switched to switch position 0. A differential voltage $\Delta U=UB-U1$ then exists between two conductors L1 and L2. A logical 0 occurs on the bus because switch S3 is switched to switch position 0 and switch S4 is switched to switch position II. In this case, a differential voltage ΔU=UB−U3 exists between conductors L1 and L2. Switches S1, S2 and S5 remain in switch position 0.

Figure 5:
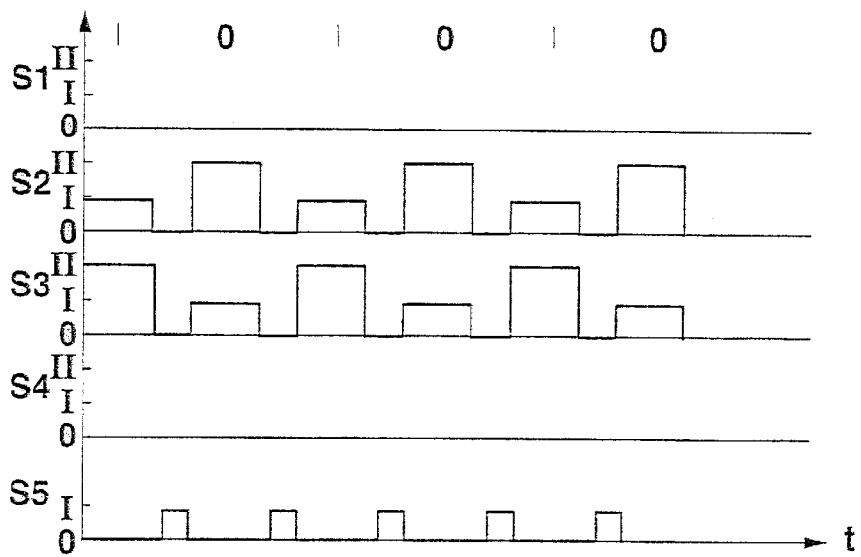
FIG. 5 shows switching operations of the bus driver circuit in the event of healthy bus conductors with a very high-speed data transmission.

If a message is to be transmitted at the highest possible rate over the bus to individual modules M1, Mn, e.g., an ignition command at a bit rate of 125 kbit/s, then switch S5 in the shunt arm of the H-bridge is switched briefly into switch position I between switching through two different voltage levels as illustrated in FIG. 5, thus briefly connecting two bus conductors L1 and L2 and thus bringing them both to the same voltage potential. FIG. 5 shows as an example transmission of a message over the bus when both bus conductors L1 and L2 are healthy, i.e., there is no short circuit. FIG. 5 illustrates clearly that switch S5 is closed briefly when both switches S2 and S3 are switched from switch position I to switch position II and vice versa. This measure achieves the result that the individual signal pulse edges have a greater steepness, and therefore a higher bit rate is possible. Especially in the case of signals having a high voltage range such as deployment commands, a greater edge steepness is used to achieve a high bit rate.

It is expedient to transmit the messages with the known Manchester II code because it permits transmission with the lowest possible susceptibility to fault and also guarantees easy synchronization of modules M1, Mn.

Modules M1, Mn each have electronic controls SE1, SEn. If modules M1, Mn are actuator modules, then electronic controls SE1, SEn have the function of controlling the deployment of the restraint devices connected to modules M1, Mn. Electronic controls SE1, SEn may also have a fault diagnostic function for the circuitry arrangement present in modules M1, Mn and the respective deployment devices of the restraint arrangement. Likewise, electronic controls SE1, SEn are also responsible for controlling a longitudinal switch SM1, SMn. If both bus conductors L1, L2 are short-circuited together at one location or if they have simultaneous short circuits to ground and to battery voltage, then the longitudinal switches in the modules directly adjacent to this short-circuit site are opened. If the bus is a ring, as illustrated in FIG. 1, then data and power can be transmitted from control unit SE to all modules M1, Mn despite such a short circuit, because data and power can be transmitted in both directions (to the right and to the left) on a ring bus.

If the power supply for electronic controls SE1, SEn in modules M1, Mn travels over the bus from control unit SE, then a bridge rectifier composed of a diode ring GR11 and GR12, GRn1 and GRn2 is connected between two bus conductors L1 and L2 on both sides of longitudinal switch SM1, SMn. It is thus possible to obtain a d.c. power supply voltage for electronic controls SE1, SEn from the data signal transmitted over the bus conductor, regardless of the direction in which this data signal is transmitted on the bus conductor.

A capacitor C1, Cn functioning as an energy buffer in the transmission of signals (deployment commands) having a high voltage range is connected upstream from each electronic control SE1, SEn.

What is claimed is:

1. A bus driver circuit for a two-conductor bus system to which are connected a control unit containing the bus driver circuit and at least one of a plurality of actuator modules and a plurality of sensor modules in a motor vehicle, the bus driver circuit feeding a pulse train signal formed by different voltage levels into a healthy bus conductor of the two-conductor bus system in the event of a short circuit on one of the two bus conductors, the bus driver circuit comprising:
   a plurality of electrically controllable switches forming an H-bridge configuration containing five H-bridge branches, wherein:
      at least one of the plurality of electrically controllable switches is present in each of the five H-bridge branches,
      the two bus conductors are each connected to one end of a shunt arm of the H-bridge configuration, and
      individual ones of the plurality of electrically controllable switches in longitudinal branches of the H-bridge configuration are switchable to at least two positions that are at different voltage levels.

2. The bus driver circuit according to claim 1, wherein:
   a first set including two of the plurality of electrically controllable switches can be switched into two of the at least two positions that are at high but different voltage levels in two longitudinal branches of the H-bridge configuration originating from different ends of the shunt arm, and
   a second set including two other ones of the plurality of electrically controllable switches in two other longitudinal branches of the H-bridge can be switched to positions which are at different low voltage levels.

3. The bus driver circuit according to claim 2, wherein:
   if a short circuit occurs on one of the two bus conductors, the control unit causes the electrically controllable switches in one of the first set and the second set in respective longitudinal branches of the H-bridge configuration which are connected to the healthy bus conductor to be switched into switch positions so that a desired pulse train is generated on the healthy bus conductor.

4. The bus driver circuit according to claim 3, wherein:
   if a short circuit to ground occurs in the two-bus conductor system, one of the plurality of electrically programmable switches connected to the two-bus conductor system and having a switch position at ground potential is switched into the switch position at ground potential.

5. The bus driver circuit according to claim 1, wherein:
   at least one of the plurality of electrically controllable switches is disposed in the shunt arm and is closed briefly between a switching through of different voltage levels over remaining ones of the plurality of electrically controllable switches in the longitudinal branches of the H-bridge configuration.

6. The bus driver circuit according to claim 1, wherein:
   the pulse train signal is transmitted as a Manchester encoded pulse train signal.

* * * * *